United States Patent
Li et al.

(10) Patent No.: US 7,029,563 B2
(45) Date of Patent: Apr. 18, 2006

(54) EDI DEVICE WITH COMPOSITE ELECTRODE

(75) Inventors: Xiang Li, Huzhou Zhejiang Province (CN); Gou-Lin Luo, Huzhou Zhejiang Province (CN)

(73) Assignee: Zhejiang Omex Environmental Engineering Ltd., Zhejiang (CN)

( * ) Notice: Subject to any disclaimer, the term of this patent is extended or adjusted under 35 U.S.C. 154(b) by 257 days.

(21) Appl. No.: 10/630,112

(22) Filed: Jul. 30, 2003

(65) Prior Publication Data

US 2004/0055887 A1    Mar. 25, 2004

Related U.S. Application Data

(60) Provisional application No. 60/445,490, filed on Feb. 6, 2003.

(30) Foreign Application Priority Data

Jul. 30, 2002  (CN)  .................... 02265981

(51) Int. Cl.
*B01D 61/46*  (2006.01)

(52) U.S. Cl. ............ 204/632; 204/627; 204/633; 204/660

(58) Field of Classification Search ........ 204/627, 204/632, 633, 660
See application file for complete search history.

(56) References Cited

U.S. PATENT DOCUMENTS

| | | |
|---|---|---|
| 2,689,826 A | 9/1954 | Kollsman |
| 2,815,320 A | 12/1957 | Kollsman |
| 4,225,413 A | 9/1980 | Karn |
| 4,753,681 A | 6/1988 | Giuffrida et al. |
| 4,925,541 A | 5/1990 | Giuffrida et al. |
| 4,931,160 A | 6/1990 | Giuffrida |
| 5,147,722 A | 9/1992 | Koslow |

(Continued)

FOREIGN PATENT DOCUMENTS

EP    0 384 716 A2    8/1990

(Continued)

OTHER PUBLICATIONS

How the Omexell 210 Module Works - 2 pgs.

(Continued)

*Primary Examiner*—Roy King
*Assistant Examiner*—William T. Leader
(74) *Attorney, Agent, or Firm*—Butzel Long

(57) ABSTRACT

An EDI device includes a composite electrode enclosed within the cylinder shell of the device. The EDI inner module preferably has one concentrate center pipe as the electrode in the center axis and at least one layer of anion/cation exchange membranes and a support frame in concentrate/dilute chambers wound around the center pipe. The electrode plate is inside the encircled cylindrical shell (isolating vessel). It is connected to an electrical contact plate located in the shell. Either the anode or cathode can be set in the center pipe, and the other electrode can be set in the vessel or shell lining. The electrical contact plate also contacts an electrical contact reed located on the vessel cover when the cover is connected to the shell. The electrical contact plate provides a reliable conductive bridge between the contact reed and the electrode plate and thus passes DC from the contact reed to the electrode plate. The electrical contact plate can be at least one plate and is preferably shaped to fit against the cylindrical vessel lining. The electrode plate is integrated with the vessel to simplify the whole structure and improve the reliability of the electrical contact.

20 Claims, 1 Drawing Sheet

U.S. PATENT DOCUMENTS

| | | |
|---|---|---|
| 5,259,936 A | 11/1993 | Ganzi |
| 5,292,422 A * | 3/1994 | Liang et al. ............... 204/632 |
| 5,308,466 A | 5/1994 | Ganzi et al. |
| 5,316,637 A | 5/1994 | Ganzi et al. |
| 5,376,253 A | 12/1994 | Rychen et al. |
| 5,425,858 A | 6/1995 | Farmer |
| 5,593,560 A * | 1/1997 | Inoue ...................... 204/671 |
| 5,779,891 A * | 7/1998 | Andelman ............... 210/198.2 |
| 5,858,191 A | 1/1999 | DiMascio et al. |
| 5,868,915 A | 2/1999 | Ganzi et al. |
| 5,925,255 A | 7/1999 | Mukhopadhyay |
| 5,954,937 A | 9/1999 | Farmer |
| 6,190,528 B1 * | 2/2001 | Li et al. .................... 204/632 |
| 6,193,869 B1 | 2/2001 | Towe et al. |
| 6,284,117 B1 | 9/2001 | Smolko et al. |
| 6,284,124 B1 | 9/2001 | DiMascio et al. |
| 6,309,532 B1 | 10/2001 | Tran et al. |
| 6,312,577 B1 | 11/2001 | Ganzi et al. |
| 6,328,896 B1 | 12/2001 | Atnoor et al. |
| 6,398,965 B1 | 6/2002 | Arba et al. |
| 6,436,264 B1 | 8/2002 | Tamura |
| 6,787,046 B1 * | 9/2004 | De Kock et al. ........... 210/748 |
| 2002/0011413 A1 | 1/2002 | DiMascio et al. |

FOREIGN PATENT DOCUMENTS

| | | |
|---|---|---|
| EP | 0 660 747 B1 | 7/1995 |
| EP | 0 892 677 B1 | 1/1999 |
| WO | WO 94/06548 | 3/1994 |
| WO | WO 95/32803 | 12/1995 |
| WO | WO 97/28889 | 8/1997 |
| WO | WO 98/11987 | 3/1998 |
| WO | WO 98/20972 | 5/1998 |
| WO | WO 99/50184 | 10/1999 |
| WO | WO 00/44477 | 8/2000 |
| WO | WO 02/14224 A1 | 2/2002 |

OTHER PUBLICATIONS

The New Leader in ED—Omexell 210 Module - 2 pgs.

The New Leader in EDI—Omexell System—2 pgs.

An Introduction to Spiral Wound EDI, Water Technology—4 pgs. (Jan. 2003).

* cited by examiner

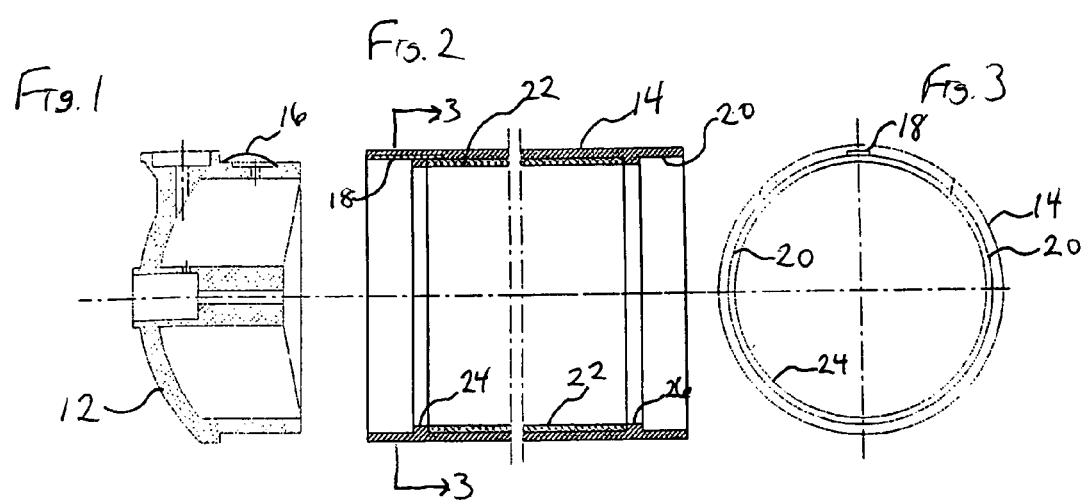

EDI DEVICE WITH COMPOSITE ELECTRODE

This application claims benefit of provisional application 60/445,490 filed on Feb. 6, 2003.

FIELD OF THE INVENTION

This invention relates to an electrodeionization (EDI) water producing device. In particular, this invention relates to electrodes used in an EDI module and to improvements in the electrode structure.

BACKGROUND OF THE INVENTION

Water treatment equipment is broadly used in many industry fields. Traditional water treatment processes treat water by desalting source water. Typically, desalted equipment combines ion-exchange technology and electrodialysis technology. For example, Chinese Patent No. 96244875.4 shows an EDI device which combines ion-exchange technology and electrodialysis technology. In Chinese Patent No. 96244875.4, anion and cation resin is placed inside a dilute water chamber of the electrodialysis device and positive and negative electrodes are placed outside the device.

The advantages of this approach are that the same distance is achieved between every two arrays of membranes, the EDI device has a reliable and stable resistance, and the current intensity is relatively easy to control. The disadvantage of this approach is that it is difficult to fill the device with resins; special ion fiber knitting is necessary. To resolve this issue, an improved EDI module uses a spiral wound cylinder structure.

Chinese Patent No. 00220610.2 shows a multi-surface volume EDI module which consists of positive and negative electrodes, membrane bags and a frame. The anion and cation ion exchange membranes are combined with isolation net sheets to form membrane bags which fold to include concentrate water channels and dilute water channels. Each of the concentrate water channels and the dilute water channels connects to a different individual water collection chamber extending from a dilute/concentrate collection pipe. The dilute water channels are filled with ion-exchange resins, and consist of linked together rectangular channels.

It is known that the anode is set on the shell of this kind of EDI, while the cathode is placed within the shell. In other words, while the cathode is located within the EDI device, the anode is manufactured separate from the EDI device vessel and is attached to the outside of the device.

U.S. Pat. No. 6,190,528, issued Feb. 20, 2001 to Xiang Li et al. discloses a helical EDI apparatus having the disadvantages described above. The anode 10 of the EDI device disclosed in U.S. Pat. No. 6,180,528 is also manufactured separately and subsequently attached to the outside of the EDI device. U.S. Pat. No. 6,190,528 is incorporated herein by reference in its entirety.

SUMMARY OF THE INVENTION

In accordance with a preferred embodiment, an electrodeionization (EDI) device includes a shell surrounding an inner module, an electrode enclosed within the inner wall of the shell, and an electrical contact plate attached along the inner wall of the shell. The electrical contact plate is conductively connected to the electrode within the shell to transfer current to the electrode. This embodiment may also include a first vessel cover connected to the shell at its first end, and an electrical contact member attached to the first vessel cover. The electrical contact member is arranged to conductively connect to the electrical contact plate to transfer current to the electrical contact plate.

In another preferred embodiment, an electrodeionization (EDI) device includes an anion exchange membrane, a cation exchange membrane, a first electrode, at least one membrane bag formed by the anion exchange membrane and the cation exchange membrane, and a second electrode. The membrane bag also includes a concentrate flow channel. A dilute water flow channel is located adjacent to the at least one membrane bag. The at least one membrane bag and the dilute flow channel forms an inner module. The EDI device also includes a shell surrounding the inner module, and an electrical contact plate attached along the inner wall of the shell. The second electrode is enclosed within the inner wall of the shell. The electrical contact plate is conductively connected to the second electrode within the shell to transfer current to the second electrode.

Further scope of applicability of the present invention will become apparent from the description given hereinafter. However, it should be understood that the detailed description and specific examples, while indicating preferred embodiments of the invention, are given by way of illustration only, since the invention will become apparent to those skilled in the art from this detailed description.

BRIEF DESCRIPTION OF THE DRAWINGS

The invention will be described in conjunction with the following drawings in which like referenced numerals designate like elements and wherein:

FIG. 1 is a sectional view of an EDI vessel (module) cover in accordance with a preferred embodiment of the invention;

FIG. 2 is a sectional view of the frame of the EDI module in accordance with the preferred embodiments; and FIG. 3 is a top view of the EDI module along line 3—3 of FIG. 2.

DETAILED DESCRIPTION OF THE INVENTION

This invention resolves problems of the complex manufacture for EDI device electrodes, namely weak intensity and unreliable electrical contact. In a preferred embodiment, a spiral wound EDI device vessel includes a composite electrode wrapped within the EDI vessel cylinder shell. The cylinder shell and composite electrode are arranged to fit around a spiral wound EDI inner module. An exemplary inner module includes a concentrate center axial conduit or pipe that is also an electrode axially positioned along the center axis of the EDI device. The exemplary EDI inner module also includes anion and cation ion exchange membranes connected and wound about the axial conduit to form concentrate/dilute water chambers. Either the anode or cathode can be placed or attached to the axial conduit. The other electrode can be set in the vessel lining of the shell as an electrode plate. Preferably, the electrode plate is positioned within adjacent inwardly extending shoulders of the vessel lining of the EDI device cylinder shell. The shoulders also abut the top and bottom covers when the EDI module is fully assembled. When assembled, the top and bottom covers are attached to the shell to form a housing.

An electrical contact plate electrically communicates with the electrode plate. The electrode contact plate and electrode plate are preferably formed of titanium or stainless steel. An electrical contact reed attached to one of the vessel covers electrically communicates with the electrical contact plate when the vessel cover is attached to the cylinder shell. The contact reed is preferably integrated with the cover.

Preferably, the surface of the electrode plate is coated with a platinum or a silver-ruthenium alloy layer to improve the electrical permeate. Alternatively, the preferred electrode is made of alloy. While not critical to the invention, the electrode plate is preferably the anode.

The electrical contact reed is preferably connected to the DC in the cover of the EDI device. The electrode plate is integrated within the vessel to simplify the EDI module structure and improve the reliability of the electrical contact.

The invention can best be seen, by example, in FIGS. 1–3. FIG. 1 shows a vessel cover 12 adapted to be frictionally coupled to an EDI cylindrical shell 14. The vessel cover 12 includes an electrical contact reed 16 arranged for electrical contact with an electrical contact plate 18 attached within an inner wall 20 of the cylindrical shell 14. As can best be seen in FIGS. 2 and 3, the cylindrical shell 14 also encloses an electrode plate 22, which is preferably an anode, within the inner wall 20. The shell 14 also includes two shoulders 24, 26 extending inwardly from the inner wall 20. The shoulders 24, 26 abut the edges of the electrode plate 22 and keep the plate from sliding longitudinally within the cylindrical shell 14. The electrode plate 22 contacts the electrical contact plate 18. The vessel covers 12 are attached to the cylindrical shell 14 to form an EDI housing. When the EDI housing is assembled, the electrical contact plate 18 electrically communicates with both the electrical contact reed 16 and the electrode plate 22, and thus becomes a conductive bridge therebetween. The electrical contact reed 16 is electrically coupled to DC outside the shell 14, and thus the contact reed and electrical contact plate provide reliable DC contact to the electrode plate 22.

The cylindrical shell 14 is preferably made of FPR or plastic. The electrode plate 22 is preferably made of stainless steel or titanium alloy coated with platinum layer or silver-ruthenium alloy layer. Alternatively, the electrode plate 22 is made of an alloy material. As described above, the EDI inner module has a concentrate center pipe as the electrode along the center axis of the EDI module, with at least one layer of anion/cation exchange membranes and a support frame in concentrate/dilute chambers wound around the center pipe. The electrode plate is integrated with the vessel to simplify the whole structure and improve the reliability of the electrical contact.

The support frame is described in combination with an EDI device that is spiral wound or helical. It is understood that the support frame can also be used with other types of EDI devices, including stacked EDI devices. Accordingly, the scope of the invention is not limited to spiral wound EDI devices, but includes various other types of EDI devices, as readily understood by a skilled artisan.

It should be apparent from the aforementioned description and attached drawings that the concept of the present invention may be readily applied to a variety of preferred embodiments, including those disclosed herein. For example, as previously noted, while the support frame is described in accordance with a preferred embodiment for a helical EDI device, it is understood that the frame is applicable to other types of EDI devices, including stacked EDI devices, in accordance with other preferred embodiments. Without further elaboration, the foregoing will so fully illustrate the invention that others may, by applying current or future knowledge, readily adapt the same for use under various conditions of service.

What is claimed is:

1. An electrodeionization device comprising: a shell surrounding an inner module, said shell including a first end, a second end opposite the first end, and an inner wall; an electrode enclosed within the inner wall of said shell; and an electrical contact plate attached along the inner wall of said shell, said electrical contact plate conductively connected to said electrode within said shell to transfer current to said electrode.

2. The device of claim 1, further comprising a first vessel cover connected to said shell at the first end, and an electrical contact member attached to said first vessel cover, said electrical contact member arranged to conductively connect to said electrical contact plate to transfer current to said electrical contact plate.

3. The device of claim 2, wherein said electrical contact member is a reed electrically coupled to a DC source outside of said device such that DC is transferred to said electrode.

4. The device of claim 2, wherein said electrical contact plate is arranged to be a conductive bridge between said electrical contact member and said electrode.

5. The device of claim 2, said shell further including a first shoulder extending inwardly from the inner wall, said first shoulder abutting said electrode adjacent the first end, said first shoulder arranged to restrict said electrode from sliding beyond said first shoulder toward said first vessel cover, and to restrict said first vessel cover from sliding beyond said first shoulder toward said electrode.

6. The device of claim 2, further comprising a second vessel cover connected to said shell at the second end, wherein said first vessel cover, said second vessel cover and said shell form a housing for the electrodeionization device.

7. The device of claim 6, said shell further including a second shoulder extending inwardly from the inner wall, said second shoulder abutting said electrode adjacent the second end, said second shoulder arranged to restrict said electrode from sliding beyond said second shoulder toward said second vessel cover, and to restrict said second vessel cover from sliding beyond said second shoulder toward said electrode.

8. The device of claim 1, said shell further including a first shoulder extending inwardly from the inner wall, said first shoulder abutting said electrode adjacent the first end and arranged to restrict said electrode from sliding beyond said first shoulder.

9. The device of claim 8, said shell further including a second shoulder extending inwardly from the inner wall, said second shoulder abutting said electrode adjacent the second end and arranged to restrict said electrode from sliding beyond said second shoulder.

10. The device of claim 1, wherein the electrodeionization device is spiral wound to form a helical electrodeionization device.

11. The device of claim 10, wherein said electrode is a cylindrical metal member extending within the inner wall.

12. The device of claim 1, wherein said electrode is an anode.

13. The device of claim 1, wherein said electrode is formed of stainless steel or titanium alloy.

14. The device of claim 1, wherein said shell is plastic and said electrode is integrated within said plastic shell.

15. The device of claim 1, wherein said electrode is coated with platinum layer or silver-ruthenium alloy.

16. An electrodeionization device comprising: an anion exchange membrane; a cation exchange membrane; a first electrode; at least one membrane bag formed by the anion exchange membrane and the cation exchange membrane; a second electrode; said at least one membrane bag having a concentrate flow channel; a dilute flow channel located adjacent said at least one membrane bag, said at least one membrane bag and said dilute flow channel forming an inner module; a shell surrounding said inner module, said shell including a first end, a second end opposite the first end, and an inner wall, said second electrode enclosed within the inner wall of said shell; and an electrical contact plate attached along the inner wall of said shell, said electrical contact plate conductively connected to said second electrode within said shell to transfer current to said second electrode.

17. The device of claim 16, further comprising a first vessel cover connected to said shell at the first end, and an electrical contact member attached to said first vessel cover, said electrical contact member arranged to conductively connect to said electrical contact plate to transfer current to said electrical contact plate; and a second vessel cover connected to said shell at the second end, wherein said first vessel cover, said second vessel cover and said shell form a housing for the electrodeionization device.

18. The device of claim 17, said shell further including a first shoulder extending inwardly from the inner wall, said first shoulder abutting said second electrode adjacent the first end, said first shoulder arranged to restrict said second electrode from sliding beyond said first shoulder toward said first vessel cover, and to restrict said first vessel cover from sliding beyond said first shoulder toward said second electrode; and said shell further including a second shoulder extending inwardly from the inner wall, said second shoulder abutting said second electrode adjacent the second end, said second shoulder arranged to restrict said second electrode from sliding beyond said second shoulder toward said second vessel cover, and to restrict said second vessel cover from sliding beyond said second shoulder toward said second electrode.

19. The device of claim 16, wherein the electrodeionization device is spiral wound to form a helical electrodeionization device.

20. The device of claim 19, wherein said at least one membrane bag and said dilute flow channel are wound about said axially extending conduit, and said dilute flow channel is positioned between wound layers of said at least one wound membrane bag.

* * * * *